United States Patent [19]

Solomon

[11] Patent Number: 4,557,404
[45] Date of Patent: Dec. 10, 1985

[54] METERING AND DISPENSING UNIT

[75] Inventor: Arieh Solomon, Tel Aviv, Israel

[73] Assignee: Damar Holdings B.V., Rotterdam, Netherlands

[21] Appl. No.: 439,782

[22] Filed: Nov. 8, 1982

[30] Foreign Application Priority Data

Nov. 9, 1981 [IL] Israel ........................................ 64246

[51] Int. Cl.⁴ ............................................. G01F 11/18
[52] U.S. Cl. .................................... 222/325; 222/181; 222/336; 222/342; 222/361; 285/319
[58] Field of Search .............. 222/181, 325, 342, 345, 222/361, 366; 141/358, 373, 375; 248/224.1; 285/319

[56] References Cited

U.S. PATENT DOCUMENTS

| 470,018 | 3/1892 | Strong | 222/361 X |
| 674,168 | 5/1901 | Kinnard | 141/358 X |
| 901,868 | 10/1908 | Bateman | 222/361 |
| 1,758,999 | 5/1930 | Carns | 222/361 |
| 2,103,063 | 12/1938 | Clark | 222/325 |
| 2,670,105 | 2/1954 | Huhn | 222/181 X |
| 2,827,083 | 3/1958 | Cortner | 141/372 |
| 3,193,159 | 7/1965 | Swindler | 222/181 X |

Primary Examiner—Joseph J. Rolla
Assistant Examiner—Frederick R. Handren
Attorney, Agent, or Firm—Handal & Morofsky

[57] ABSTRACT

A metering and dispensing unit comprises a body 13, a drawer 14 and a track unit 15. The unit 13 includes upstanding walls for holding a container 12 which is filled in use with granular material, such as coffee. The container 12 is sealed to the unit 13 by an upstanding wall 29 and a port 31 is provided for passage of coffee towards the drawer 14. The port is partly closed off by a sloping segment 51. When the drawer 14 closes a relatively sharp edge 52 scraps a surface 39 of the drawer 14 to clean off any material on that surface.

5 Claims, 10 Drawing Figures

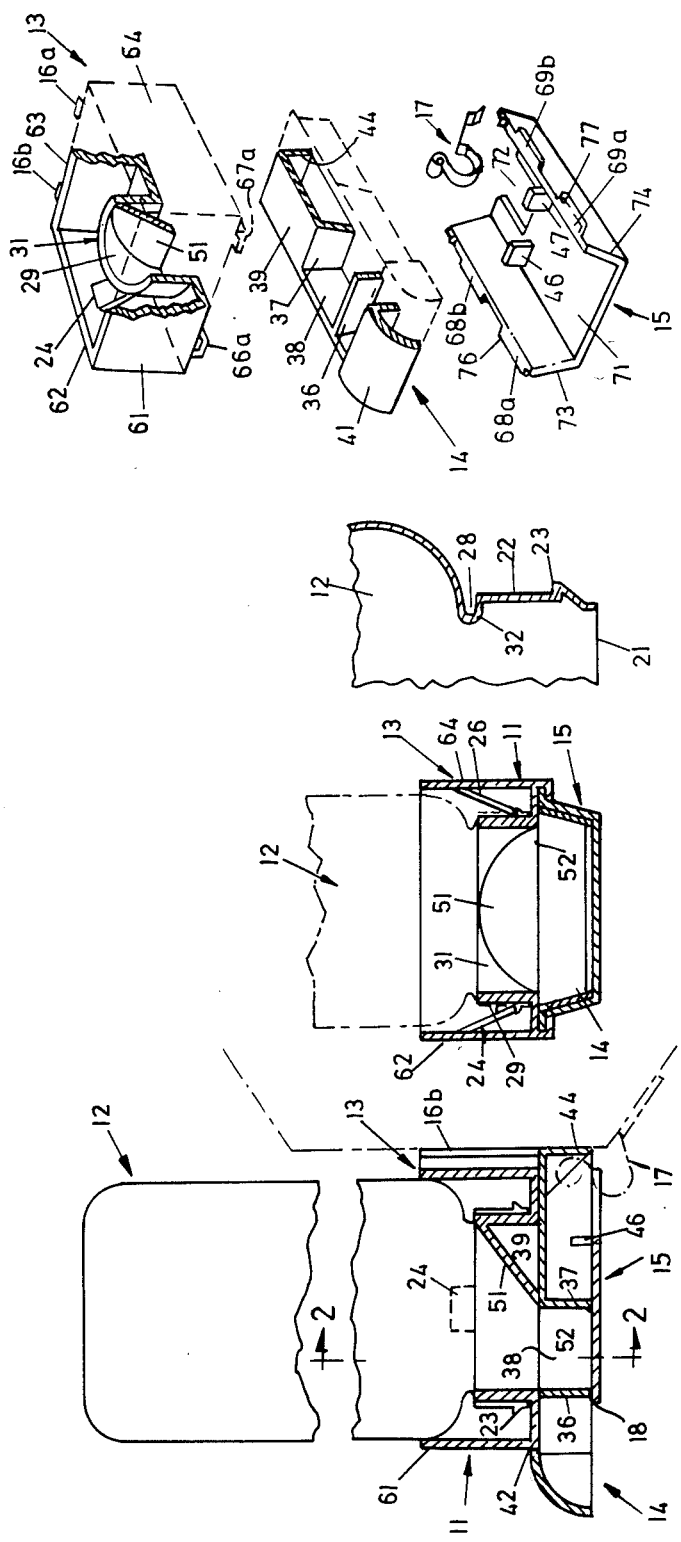

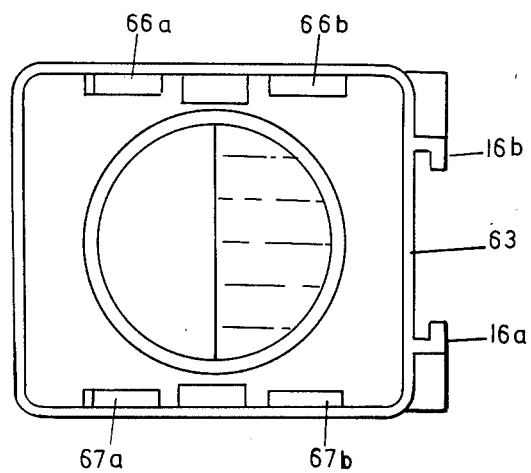
FIG_5
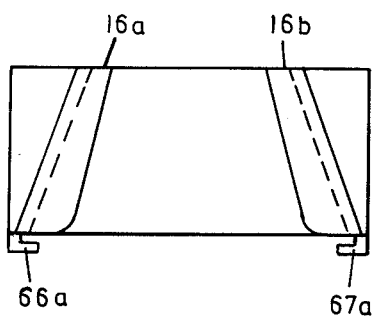
FIG_6

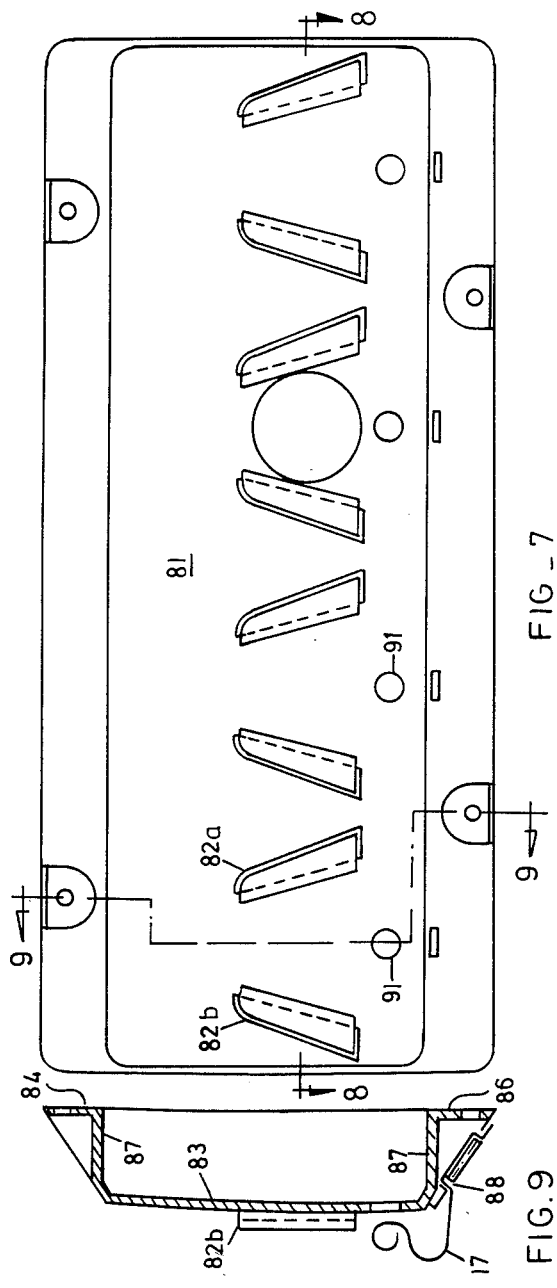
FIG._7
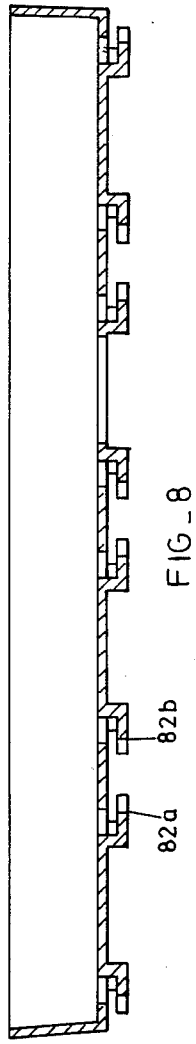
FIG._8
FIG._9
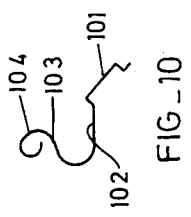
FIG._10

METERING AND DISPENSING UNIT

BACKGROUND TO THE INVENTION

This invention is concerned with storing, metering and dispensing assemblies and more particularly with such assemblies that are used for metering and dispensing granulated materials that are used to prepare or vary the taste of drinks, soups, or the like.

Presently there are many granular material storing, metering and dispensing assemblies. Such dispensing assemblies for example are used in vending machines that sell coffee and/or various soups made from powdered mixes. Also such dispensers are used for example in cafeterias, offices or factories for the individual purchasers to put the desired metered amounts of granulated material into their own coffee cup, tea cup or soup bowl. The presently available dispensers contain metering devices which receive the granular material such as coffee, tea, sugar, powdered soup, powdered cream or the like into a fixed space in the dispenser. The dispenser is then moved from its "metering" position to its "dispensing" position for transferring the fixed amount of powdered material into the cup or the like.

Present day dispensers are adversely effected by the accumulation of the powdered or granulated materials on surfaces of the dispensing assembly which then tend to inhibit the movement of the dispensing assembly. The accumulated material is subjected to the heated vapours of the coffee, soup or the like positioned to receive the dispensed material. The adverse effect is amplified because the vapours cause the unwanted accumulation of powdered or granular materials to solidify.

Another difficulty with the presently available dispensing assemblies is that they are in many cases complicated devices that are difficult and costly to manufacture.

A further problem encountered with prior art storing, metering and dispensing assemblies is that the container of the granulated material positioned for dispensing its material is also subjected to the heated vapours of the liquid into which the powdered material may be dispensed. The heated vapours adversely affect the contents of the containers by solidifying these contents and making it difficult if not impossible to properly operate the dispensing unit as well as ruining the contents of the container and therefore reducing commerical prospects.

Prior art dispensers make use of biasing means to return the dispenser to the normal metering position after the dispensing operation. Such biasing means have been rubber band type devices which do not prove satisfactory because of difficulty in mounting and dismounting such biasing means. Such biasing means are also often unreliable, have short lifetimes and are not satisfactory for automatic assembling during fabrication of the units.

Yet another problem in presently available assemblies is that the mounting brackets for retaining the dispensing devices are parallel sided. Such brackets are unsatisfactory both because of the difficulties of mounting and dismounting the dispensing devices when, for example, it is necessary to replace the dispensing devices, or when it is necessary to clean the apparatus for sanitary reasons, say.

It is an object of the present invention to provide improved granular material metering and dispensing assemblies in which the above-referred to disadvantages and problems are substantially reduced or overcome.

SUMMARY OF THE INVENTION

According to the invention there is provided a metering and dispensing unit for dispensing metered quantities of granular material from a container comprising a body having upstanding walls for holding the container and a central port to engage in and seal with the mouth of the container, a drawer which fits below the body and includes a metering compartment for receiving the granular material through the central port when the drawer is closed and arranged to discharge a metered quantity of granular material when the drawer unit is opened, the drawer being provided with a closure wall to close off the port when the drawer is open, and a track unit extending around the drawer having means to engage with and to connect the track unit to the body so as to hold the drawer in close sliding co-operation with the body and the track unit.

The port means may be partly closed off by a sloping segment extending partly across the port and arranged to guide granular material into the metering compartment. The lower edge of the sloping segment may be chamfered to provide a sharp edge which scrapes against closure wall when the drawer closes.

The unit may include a spring biasing means arranged to engage with the rear of the drawer to bias the drawer towards its closed position.

The body may be provided with two rails mounted on a rear surface thereof for co-operation with a vertical wall mounting bracket, the longitudinal axes of the rails being inclined at an acute angle to one another so that the rails are more spaced apart adjacent the lower side of the body.

The body may be provided with discontinuous channels at each side of its lower side and the track unit is provided with co-operating discontinuous flanges which enable the flanges to be inserted between the channels and slid into position and to assemble the track with the body. At least one of the channels or the flanges may be provided with a stop which prevents sliding of the track unit relative to the body when the track unit is assembled with the body.

The unit may include downwardly extending clips attached to the upstanding walls of the body to engage and secure the mouth of the container to the body.

Manual gripping means may be provided on the front of the drawer which extends to and provides a raised edge to abut against the body when the drawer is in a fully closed position.

The inner lower surface of the rail unit may be provided with a pair of upstanding stops for engaging with a rear part of the drawer to prevent opening movement of the drawer beyond a fully open position.

An embodiment of the invention will now be described by way of example with reference to the accompanying drawings in which

BRIEF DESCRIPTION OF THE DRAWINGS

FIG. 1 is a sectional view of a metering and dispensing unit;

FIG. 2 is a sectional view taken along line 2—2 of FIG. 1 looking in the direction of the arrows;

FIG. 3 is a sectional view of part of a granular material container;

FIG. 4 is a part sectional exploded isometric view of the unit;

FIG. 5 is a plan top view of part of the unit;

FIG. 6 is a rear view of the same part of the unit shown in FIG. 5;

FIG. 7 is a front view of a housing into which the unit fits in use;

FIG. 8 is a sectional view of FIG. 7 taken along a line 8—8 and looking in the direction of the arrows;

FIG. 9 is a sectional view of FIG. 7 taken along the line 9—9 and looking in the direction of the arrows; and FIG. 10 is an isometric view of the spring element used for retaining the dispensing unit in a normal metering position.

DESCRIPTION OF A PREFERRED EMBODIMENT

Referring to the drawing, in FIGS. 1, 2, 3 and 4 the unit 11 is attached to a container 12 for holding the material to be dispensed, the container is held by upstanding walls 61 and 62 in a body 13 which positions the container 12 above a metering and dispensing drawer 14 which rides on a track unit 15. Rails 16a and 16b (FIG. 6) are provided for positioning the metering and dispensing unit on a retaining bracket 82a, 82b of FIG. 7.

A spring 17 which is retained in a slot 88 (FIG. 9) hooks behind a wall 44 to retain the drawer 14 in a normal metering or closed position, that is with a metering portion 18 of the drawer 14 located so as to receive granular material from the container 12.

The container 12 comprises a plastic bottle having a mouth 21 and a cylindrical wall 22. The cylindrical wall has a barbed ridge 23. The barbed ridge 23 is used for locking the container into place on the unit 11. Biased clips 24 and 26 extending from the walls 62 and 64 mesh with the upper portion of the barbed ridge 23 to lock the container 12 in place. The biased clips 24 and 26 are integral with the walls 27 and 43 of the body 13 and are made from plastic and are elastic enabling the ready attachment of the container 12 to the body 13.

The container 12 is arranged to be sealed to the unit 13 by the provision at a circular groove 28 which fits over and seals with a cylindrical upstanding wall 29 of a port 31 in the body 13. A lower inner surface 32 of the groove 28 mates with the top surface of the wall 29 to form a seal. The surfaces of the wall 29, or at least the surface of the top of the wall 29, are preferably covered with a material such as silicone to enhance sealing with the container 12.

In the prior art where no seal arrangements are provided hot vapours can enter a granular material container to adversely affect the contents of the container. The sealing arrangements herein described prevent or at least minimize the entrance of vapours into the container 12 and reduce any wastage of granular material.

The metering and dispensing drawer 14 includes, as mentioned above, the metering section 18. The metering section is defined by a front wall 36, a rear wall 37 and side walls 38 as shown in FIG. 4. A closing wall 39 at the rear of the drawer 14 is provided for closing off the port 31 during the dispensing operation, that is when the drawer 14 is open. The wall 39 moves to cover the bottom of the port 31 during the dispensing operation. It will be noted that the quantity of material dispensed can be varied by varying the volume of the metering section 18. The volume can be varied by, for example, changing the position of the rear wall 37.

A handle 41, consisting of a shaped section is integrally formed with the drawer 14 and enables the user to pull the drawer unit 14 against the force of the spring 17. Part of the handle 41 is spaced somewhat above the top of the rest of the drawer 14 to form a stopping edge 42 which abuts a forward wall 43 of the body 13 and limits rearward travel of the drawer unit 14 and retain it in its normal or closed position.

The limiting of the forward movement of the drawer 14 when it is pulled out for the dispensing operation is acheived by a rear wall 44 on the drawer 14 abutting against upstanding stops 46 and 47 on the track unit 15.

The body 13 includes means for preventing any accumulation of the material that falls from the container 12. A sloping segment 51 is provided in the port 31. Thus the material leaving the container 12 normally slides down the surface of the segment 51 and is guided into the metering section 18 of the drawer 14. A relatively sharp edge 52 at the lower end of the sloping segment 51 is arranged to clean off any material on the surface 39 as the drawer unit 14 returns to its normal position. It will be noted that the lower edge of the rear wall 37 is also shaped to provide a sharp edge to scrape the surface of the track unit 15 as the drawer 14 is moved towards its open position. Thus there is no accumulation of granular material above or below the metering section 18, as would be the case especially if there were any horizontal surfaces in that region.

Further, any granular material which falls onto the surface 39 is cleaned off and pushed into the metering section 18 as the drawer 14 is closed.

As seen in FIG. 4, the body 13 has peripheral walls 61, 62, 63 and 64. Channels 66a, 66b and 67a, 67b are provided to receive flanges 68a, 68b and 69a, 69b extending from the track unit 15. The channels 66 and 67 and flange 68 and 69 are each formed in separate parts, a and b, for greater ease and to facilitate engagement of the track unit 15 to the body 13. The channels 66 and 67 are best seen in FIGS. 4 and 5.

The track unit 15 includes a floor section 71 which has a cut-out portion 72 into which the spring 17 fits. Two sloping side walls 73 and 74 of the track unit 15 extend up to the flanges 68 and 69 on the track unit 15. The track unit 15 is locked in place in the body 13 by upstanding projections 76 and 77 on the flange parts 68a and 69a which respectively abut against slots formed above the channel parts 66a and 67a in the lower surface of the body 13.

The metering and dispensing unit is formed by making the body 13, the drawer 14 and the track unit 15 separately. Prior to the assembly together of body 13 and track unit 15, the drawer 14 is placed in position on the floor 71 of the track unit 15 with the wall 44 behind the stops 46 and 47. The flange parts 68a and 69a are then placed between the channel parts 66a and 66b, and 67a and 67b respectively and after being aligned, the flanges 68 and 69 are slid into the channels 66 and 67. The track unit 15 is locked into position by the stops 76 and 77.

It has been explained that the parts comprising the body 13, the drawer 14 and track unit 15 are separately made which is conveniently carried out by any suitable plastics material forming operation. Each part requires no enclosed cavities to be provided during forming, nor do the parts need to be made up of other components and later fixed together. All the mating areas of the parts are generally flat or planar and so are readily formed in automatic machines. It will also be noted that the channels 66 and 67 are in effect formed of material which would otherwise form part of the base of the body 13. In fact the material used to form the channels provides slots (as seen in FIG. 5) in the base of the body 13 so that plastics material flow during forming of the body 13 is significantly simplified.

It will be appreciated that not only is the described three part assembly easier to make than other earlier overall metering and dispensing units of this type but assembly into the overall metering and dispensing unit 11 is simple and effective. Further, the unit 11 can be readily disassembled either to correct or change any faulty parts 13, 14 and 15 or for cleaning after use. It is proposed in use to supply the unit 11 together with a charged container 12. It may be that after the container 12 is emptied the unit 11 together with its container 12 will be discarded. On the other hand if a new charged container 12 is to be fitted or the container 12 is to be refilled, it is essential that the unit 11 can be properly cleaned before second and further use. Ease of disassembly is therefore an important improvement over prior art units of this type.

FIG. 7 shows a housing 81 for supporting four of the metering and dispensing units 11. Flanged track-like brackets 82a and 82b are provided which mesh with the rails 16a and 16b of the dispensing unit, respectively. The housing 81 is shown as having a raised section 83 which is displaced from a wall (not shown) to which the housing is mounted in use. The section 83 is displaced from and extends between bottom and top wall fixing flanges 84 and 86 by being connected thereto by members 87 respectively. A slot 88 is provided by the housing for holding each spring 17.

The housing 81 is provided with apertures 91 to enable a solenoid operated piston for example to move the drawer unit 14 against the force of the spring 17 to enable automatic dispensing if desired.

The brackets 82a and 82b are inclined to one another to conform to the relative disposition of the rails 16a and 16b (see FIG. 6).

The inclination of the brackets 82 and rails 16 greatly facilitates the engagement of the rails 16 over the brackets 82, no special alignment is necessary because as the rails 16 are lowered over the brackets 82 self-alignment takes place. Further, the lifting of the body 13 relative to the housing 81 immediately separates the mating surfaces of the rails 16 and the brackets 82 and overcoming of sliding friction does not apply. In earlier metering and dispensing units of this type the rails 16 and brackets 82 are parallel so that considerable difficulty is experienced not only in correct location but in moving the rail relative to the brackets where mating surfaces must slide against each other.

FIG. 8 shows clearly the flanged brackets 82a and 82b. As explained above, easy removal of the unit 11 and replacement is now provided which enables and encourages the cleaning of the unit 11 as well as the housing 81 for sanitary purposes, for example.

The spring 17 in FIG. 10 is shaped as shown to facilitate positioning of the spring 17 into the slot 88. The bottom portion 101 of the spring 17 is shaped to fit into the slot 88. Leading from the bottom portion 101 is a U-shaped portion 102 which then leads into the convoluted section 103. It is the actual curl 104 of the spring that rests against the back of the drawer 14 to hold it in its normal metering position.

In operation the container 12 is attached to the unit 11 and then the unit 11 is lowered onto the flange brackets 82 in the housing 81. A user places a cup underneath the unit 11 and pulls out the handle 41. This causes the metering section 18 which is full of granular material such as sugar, coffee, tea, powdered milk, soup and the like, to move away from the closed position and empty its contents into the cup. The user pushes the drawer 14 closed or merely releases the handle 41 and the drawer 14 returns to its normal position. The metering section 18 will again fill with granular material from the container 12.

I claim:

1. A metering an dispensing unit for dispensing metered quantities of granular material from a container comprising a body having upstanding walls for holding the container and a central port to engage in and seal with the mouth of the container, a separately formed drawer which fits below the body and includes a metering compartment for receiving the granular material through the central port when the drawer is closed and arranged to discharge a metered quantity of granular material when the drawer unit is opened, the drawer being provided with a closure wall to close off the port when the drawer is open, and a separately formed track unit extending around the drawer having means to engage with and to connect the track unit to the body so as to hold the drawer in close sliding co-operation with the body and the track unit, the body being provided with discontinuous channels at each side of its lower surface and the track unit being provided with co-operating discontinuous flanges which enable the flanges to be inserted between the channels and slid into position to assemble the track unit to the body, and to allow disassembly of the track unit from the body after a period of use.

2. A unit according to claim 1, in which the port is partly closed off by a sloping segment extending partly across the port and arranged to guide granular material into the metering compartment.

3. A unit according to claim 2, in which the lower edge of the sloping segment is chamfered to provide a sharp edge which scrapes against closure wall when the drawer closes.

4. A unit according to claim 1, including a spring biasing means arranged to engage with the rear of the drawer to bias the drawer towards its closed position.

5. A unit according to claim 1 in which at least one of the channels or the flanges is provided with a stop which prevents sliding of the track unit relative to the body when the track unit is assembled with the body.

* * * * *